3,282,692
PHOTOCROSSLINKABLE MATERIAL AND
METHOD OF COPYING
Wesley R. Workman, St. Paul, Minn., assignor to Minnesota Mining and Manufacturing Company, St. Paul, Minn., a corporation of Delaware
No Drawing. Filed Sept. 27, 1965, Ser. No. 490,621
5 Claims. (Cl. 96—35)

This application is a continuation-in-part of Serial No. 230,735 filed October 15, 1962, and issued on November 16, 1965, as Patent No. 3,218,168.

This invention relates to polymeric materials and coatings which are acted upon by actinic radiation. In particular the invention relates to compositions composed primarily of cellulose ethers, of which ethyl cellulose is a preferred example, which have been rendered photosensitive by incorporation of a polynuclear quinone such as 2-methylanthraquinone.

Ethyl cellulose is a component of many films and coatings which are characterized by being inert to, and unaffected by, actinic radiation such as direct sunlight.

Compounds such as 2-methylanthraquinone have been suggested as addition polymerization initiators which are activatable by actinic light, but only in conjunction with polymerizable compounds having terminal ethylenic unsaturation or equivalent reaction sites.

It has now been found that normally light-stable saturated non-polymerizable organic polymers such as ethyl cellulose may be caused to undergo a significant degree of cross-linking by simple exposure to actinic radiation, for example in the near-ultraviolet range, in the presence of suitable photoactivatable auxiliary components such as 2-methylanthraquinone.

In an illustrative example, a solution is prepared consisting of:

| | Parts by weight |
|---|---|
| 2-methylanthraquinone | 6 |
| Ethyl cellulose ("N-200") | 100 |
| Denatured alcohol | 1900 |
| Water | 600 |

The "N-200" ethyl cellulose is a white, granular, thermoplastic, normally light-stable, film-forming saturated organic polymer soluble in ketones and other solvents. It has a 47½–49% ethoxyl content, a softening range of 155–170° C., and a viscosity of 200 cps. at 25° C. measured as a 5% solution in an 80:20 mixture of toluene and ethanol.

For preliminary test purposes, a portion of the above solution is spread in a thin layer on an inert smooth substrate and allowed to dry under room conditions and subdued light, resulting in a white readily pulverizable homogeneous residue. The residue is removed from the substrate and pulverized by grinding with a mortar and pestle. It has a softening point of 160° C. Radiation from a BH-6 high pressure mercury vapor arc lamp, and which includes a high proportion of radiation falling within the ultraviolet portion of the spectrum, is directed onto a thin layer of the pulverized residue material from a distance of six inches and for two minutes. The irradiated material has a softening point within the range of 185–190° C. In these tests the softening point is conveniently determined on a Fisher-Johns melting point apparatus, a small sample in powder or particulate form being placed between two thin microscope cover glasses and observed through a binocular microscope. A five-gram weight is placed upon the upper cover glass. The softening point is taken as that temperature at which the solid particles just begin to flow out. The rate of temperature rise is about one degree per minute, and in no case greater than three degrees per minute.

Another portion of the solution is applied at a thickness of three mils on a two-mil "Mylar" tensilized polyester film backing and allowed to dry slowly under room conditions and subdued light, resulting in an opalescent blush layer. When the coated sheet material is held in momentary contact with a metal test bar heated to 155° C., the opalescent blush layer transparentizes.

The opalescent coated sheet material serves as an effective copy-sheet for the preparation of transparency copies of typewritten documents and other graphic originals by the thermographic copying process. The coated side of the copy-sheet is placed against the printed surface of the opaque original and is front-printed by brief exposure of the differentially radiation-absorptive printed original to intense infra-red radiation applied through the copy-sheet in a thermographic copying machine. A negative transparency is obtained, having clarified image areas and white opaque background areas which are still transparentizable when briefly heated to 155° C. Ultraviolet radiation, from a BH-6 lamp held six inches away, is applied for two minutes onto the coated surface of the imaged transparency. The background areas thereafter remain opaque and will not transparentize when subjected to test bar temperatures as high as 170° C. The copy is effective as a projection transparency for use in overhead projectors.

Alternatively, the opalescent copy-sheet may first be exposed to a desensitizing light pattern through a positive transparency, and then subjected to over-all heating to cause a visible change in the unexposed and still heat-sensitive background areas. For example, the coated surface of the copy-sheet is placed against the typewritten surface of a translucent onion-skin original, and ultraviolet radiation is applied for two minutes through the onion-skin original, from a BH-6 lamp held six inches away. Contacting the thus irradiated sheet material for a few seconds with a platen heated to 165° C. selectively transparentizes the non-irradiated image portions of the opalescent coating; the light-exposed background areas remains white and visibly opaque.

It is found that the polymeric coating is made more resistant to solvents as well as to heat by irradiation. As an example, an opalescent coating on polyester film is exposed to a pattern of actinic radiation through a photographic transparency as hereinbefore described, and is then lightly swabbed with alcohol using a soft cotton pledget. The unexposed areas are rapidly dissolved and removed; the visibly opaque exposed areas resist the solvent and are retained.

The same effect is obtainable with initially dense coatings as well as with the blush coatings. Dense transparent coatings may be produced by over-all heating of the blush coatings prior to irradiation, or more simply by merely omitting the water from the coating solution. Coatings of this nature are particularly useful as photoresists. The coating, on a smooth metal substrate, is first exposed to ultraviolet radiation through a suitable mask, and the unexposed portions are removed with a suitable solvent. The thus exposed portions of the metal substrate may then be etched or otherwise treated to provide a printing surface.

What is claimed is as follows:
1. Method of copying comprising forming on the smooth surface of a supporting substrate a thin uniform dry photocrosslinkable coating consisting essentially of normally light-stable saturated non-polymerizable organic cellulose ether polymer and a substituted anthraquinone photoactivatable auxiliary component, exposing portions of said coating to ultraviolet radiation in a desired image pattern and to an extent sufficient to cause cross-linking of said polymer, and submitting the entire coating to an agency for visibly distinguishing the exposed and unexposed areas of said coating.

2. Method of copying comprising exposing to ultraviolet radiation the image-defining areas of a thin layer of a photocrosslinkable mixture of ethyl cellulose and 2-methyl-anthraquinone, and then selectively dissolving and removing the unexposed portions of said layer.

3. Method of copying comprising exposing to ultraviolet raditaion the image-defining areas of a thin opalescent blush layer of a photocrosslinkable mixture of ethyl cellulose and 2-methylanthraquinone, and then heating the entire layer to selectively fuse and densify the unexposed portions of said layer.

4. An article having a smooth surface covered with a thin coating of a photocrosslinkable mixture of ethyl cellulose and 2-methylanthraquinone.

5. A composition of matter which in dry powder form is capable of undergoing an increase of at least about 10° C. in softening temperature on exposure to actinic radiation from a BH–6 high pressure mercury arc lamp at 6 inches for 2 minutes, the softening temperature being determined with the sample between cover glasses under a weight of 5 grams and under a uniform rate of temperature increase of 1–3° C. per minute, said composition consisting essentially of ethyl cellulose and 2-methylanthraquinone.

No references cited.

NORMAN G. TORCHIN, *Primary Examiner.*

R. H. SMITH, *Assistant Examiner.*